United States Patent [19]
de Boer et al.

[11] Patent Number: 6,127,299
[45] Date of Patent: Oct. 3, 2000

[54] PROCESS FOR PREPARING A HYDROPROCESSING CATALYST FROM WASTE HYDROPROCESSING CATALYST

[76] Inventors: Mark de Boer, Breestraat 24, 3811 BJ Amersfoort; Johannes Wilhelmus Maria Sonnemans, De Colignylaan 9, 3761 DD Soest, both of Netherlands; Pankaj Himatlal Desai, 10802 Braes Bayou, Houston, Tex. 77001; Jaap Enters, 4019 Long Grove Dr., Seabrook, Tex. 77586

[21] Appl. No.: 08/734,986

[22] Filed: Oct. 22, 1996

Related U.S. Application Data

[60] Provisional application No. 60/008,023, Oct. 27, 1995.

[51] Int. Cl.$^7$ ...................................................... B01J 23/92
[52] U.S. Cl. ............................................. 502/56; 502/313
[58] Field of Search ................................... 502/300, 305, 502/313, 20, 56; 585/904, 905, 906

[56] References Cited

U.S. PATENT DOCUMENTS

| | | | |
|---|---|---|---|
| 2,666,086 | 1/1954 | Pitzer | 502/27 |
| 4,581,339 | 4/1986 | Bhatt et al. | 502/38 |
| 4,684,619 | 8/1987 | Moore | 502/330 |
| 4,888,316 | 12/1989 | Gardner et al. | 502/20 |
| 4,914,249 | 4/1990 | Benedict | 585/443 |
| 5,559,066 | 9/1996 | Poepel et al. | 502/20 |

FOREIGN PATENT DOCUMENTS 68890  6/1977  Japan .

*Primary Examiner*—Steven P. Griffin
*Assistant Examiner*—Stuart L. Hendrickson
*Attorney, Agent, or Firm*—Oliff & Berridge, PLC

[57] ABSTRACT

The present invention relates to a process for preparing a catalyst suitable for the hydroprocessing of heavy hydrocarbon feeds, which process comprises the steps of (i) if necessary removing carbonaceous and sulphurous deposits from waste catalyst by subjecting the waste catalyst to a thermal treatment, (ii) grinding the waste catalyst obtained in step (i), (iii) mixing the ground material obtained in step (ii) with a binder and, optionally, additives, and (iv) shaping the mixture to form a new catalyst, wherein the loss on ignition of the catalyst composition mixture at any point in the steps (ii), (iii), and (iv) is not higher than 70%.

The process according to the invention is suitable, int. al., for the production of ebullated bed catalysts. In that case, it is envisaged to incorporate a macroporous additive into the catalyst composition. Spent hydroprocessing catalyst which has been used for hydroprocessing light hydrocarbon feedstocks is particularly suitable for use in the process according to the invention.

6 Claims, No Drawings

PROCESS FOR PREPARING A HYDROPROCESSING CATALYST FROM WASTE HYDROPROCESSING CATALYST

The present application is based on and claims benefit of U.S. Provisional Application No. 60/008,023, filed on Oct. 27, 1995.

In petroleum refining, catalysts are used on a large scale in the hydroprocessing of hydrocarbon feeds to remove contaminants, such as metal-containing compounds, sulphur-containing compounds, and nitrogen-containing compounds. Apart from the removal of contaminants, hydroprocessing may also effect hydrocracking of the feedstock to compounds with a lower boiling point. The catalysts used in these processes are well-known in the art. They generally consist of a Group VI hydrogenation metal component, e.g., molybdenum or tungsten, and a Group VIII hydrogenation metal component, e.g., cobalt or nickel, on a refractory oxide carrier. The oxidic carrier generally consists of alumina, silica, silica-alumina, magnesia, titania or mixtures thereof. The catalyst may additionally comprise other components, such as phosphorus or zeolites. During the hydroprocessing of hydrocarbon feeds, the activity of the catalyst decreases. This is caused, int. al., by the accumulation on the catalyst surface of carbonaceous and sulphurous deposits. Further, if the catalyst is used for hydroprocessing metals-containing feedstocks, contaminant metals, such as vanadium and nickel, will accumulate on the catalyst surface in the form of their sulphides. The accumulation of carbonaceous, sulphurous, and metallic deposits is detrimental to the activity and the selectivity of the catalyst. When these processes continue too long, the catalyst performance decreases to an unacceptably low level, and the catalyst must be replaced. The thus obtained spent hydroprocessing catalyst then has to be disposed of.

One way of disposing of spent hydroprocessing catalyst is by landfilling, but this is becoming increasingly difficult because of environmental constraints.

Catalysts used for the hydroprocessing of metals-containing hydrocarbon feeds, which will thus contain contaminant metals such as vanadium and nickel in addition to the hydrogenation metals, may be disposed of to a metals reclaimer, who will reclaim not only the hydrogenation metals but also the contaminant metals. Obviously, metals reclaimers are primarily interested in spent catalysts containing substantial amounts of contaminant metals, and far less so in catalysts which have been used for the hydroprocessing of lighter feedstocks and so contain no or hardly any contaminant metals. This means that it is even more difficult to dispose of spent hydroprocessing catalysts used for hydroprocessing lighter feedstocks than of hydroprocessing catalysts used for hydroprocessing heavy metals-containing feedstocks. In any case, both landfilling and metals reclaiming are expensive. Therefore, there is need for a process for the disposal of spent hydroprocessing catalyst, especially spent hydroprocessing catalyst which has been used for hydroprocessing lighter hydrocarbon feeds.

Another problem which is encountered more and more in the field of oil refinery is that the feedstocks to be refined tend to become heavier and heavier. Heavy feedstocks, such as feeds based on atmospheric residual oils, vacuum residual oils, tar sand oils, and shale oils, contain substantial amounts of sulphur and nitrogen components, metallic components, and large-molecular weight components such as asphaltenes. These impurities, and particularly the presence of metals and large-molecular weight components, result in a relatively fast deactivation of the catalyst used in the hydroprocessing of these heavy feeds as compared to the deactivation rates for catalysts used in the hydroprocessing of lighter feedstocks. Therefore, heavy feed hydroprocessing catalysts are used in large quantities in oil refining, which makes their price an important factor. In consequence, there is urgent need for a process for the production of low cost good-quality heavy feed hydroprocessing catalysts, and in particular for a process for producing such catalysts on the basis of inexpensive starting materials.

Japanese patent publication 68890/1977 describes a process in which a spent hydroprocessing catalyst is calcined to remove carbonaceous and sulphurous deposits, ground, mixed with a binder, and reformulated into a new hydroprocessing catalyst. The crux of the process described in this publication is that the spent catalyst is treated with water or an acidic or basic aqueous solution. This treatment is considered necessary to dissolve the hydrogenation metals and disperse them uniformly through the catalyst. Further, contaminant metals are also stated to be removed. As appears from the Examples of this document, the amount of water used in treating the catalyst is very large, the weight ratio of water to spent catalyst being of the order of 5.5:1. However, the use of such large amounts of water as envisaged in the Japanese patent publication is cumbersome on an industrial scale. It creates a separate liquid phase, which is undesirable from a technical point of view in that it tends to result in high energy consumption and large waste streams. Further, experiments carried out by applicant have shown that the use of such large amounts of water or acidic or basic solutions will lead to a substantial part of the hydrogenation metals being leached from the catalyst composition. Needless to say, this is objectionable.

Surprisingly, it has now been found that, contrary to the statements in the above-mentioned Japanese patent publication, it is not necessary to use large amounts of water or acidic or basic aqueous solution to produce a newly formulated hydroprocessing catalyst with good properties from spent hydroprocessing catalyst. It will be clear to a person skilled in the art that being able to dispense with the use of large amounts of water has advantages from the point of view of processing technique, because the presence of a separate liquid stage is avoided. It has also been found that while, according to the Japanese patent publication, it is necessary to redistribute the hydrogenation metals and remove the contaminant metals from the spent catalyst by way of a treatment with water or aqueous solutions, so causing undesirable leaching of hydrogenation metals, a high-quality novel hydroprocessing catalyst can in fact be prepared from spent hydroprocessing catalyst containing a high amount of Ni and V, namely up to a total of 15 wt. %, calculated as oxides, based on the weight of the spent catalyst from which carbonaceous and sulphurous deposits have been removed, without such a treatment being necessary.

Although the process of the invention is particularly suitable for the re-use of spent catalyst, that is, catalyst which has been deactivated by use in hydroprocessing, it is also useful in the case of catalyst which has not been used earlier for whatever reason, or for used catalyst still serviceable after normal regeneration. Apart from hydroprocessing catalysts which generally do not comprise a specific cracking component, (mild) hydrocracking catalysts, which do comprise a cracking component, such as amorphous silica-alumina or a molecular sieve component, may also be used in the process of the invention, depending on the use envisaged for the newly formulated catalyst. Again, this type of catalyst can be used either in the spent form after it has been used in (mild) hydrocracking operations, or in its unused form. In this description, all possible catalyst sources suitable for use in the process of this invention will henceforth be referred to as "waste catalyst."

The present invention thus relates to a process for preparing a catalyst suitable for the hydroprocessing of heavy hydrocarbon feeds, which process comprises the steps of (i) if necessary removing carbonaceous and sulphurous deposits from waste catalyst by subjecting the waste catalyst to a thermal treatment, (ii) grinding the waste catalyst obtained in step (i), (iii) mixing the ground material obtained in step (ii) with a binder and, optionally, additives, and (iv) shaping the mixture to form a new catalyst, wherein the loss on ignition of the catalyst composition mixture at any point in the steps (ii), (iii), and (iv) is not higher than 70%.

In this context, loss on ignition (LOI) stands for the weight loss of the product when it has been heated to a temperature of 600° C. during one hour. The loss on ignition of a product is equivalent to the water content of said product if it does not comprise any other volatile components. Since the components present in steps (ii) to (iv) comprise no volatile components other than water, a limitation of the LOI of the mixture in process steps (ii) to (iv) is in effect a limitation of the amount of water present in the mixture. As stated before, the LOI of the catalyst composition mixture should not be higher than 70% at any point in steps (ii) to (iv) of the catalyst preparation process according to the invention. Preferably, the LOI should not be higher that 60%, more preferably not higher than 55%. In comparison, during the grinding process of Example 1 of the Japanese patent publication, the ratio of spent catalyst to the amount of water present is 1:5.5. This is equivalent to an LOI of 85%.

The first step in the process according to the invention is the thermal treatment of the spent hydroprocessing catalyst in order to remove carbonaceous and sulphurous deposits and other compounds. Said thermal treatment is generally carried out by heating the spent catalyst to a temperature between 300° and 600° C., preferably between 400° and 550° C., for a period of 0.1 to 48 hours, preferably between 0.5 and 12 hours. The heating is carried out in an oxygen-containing atmosphere. In this respect it is noted that the sulphur which is present on the spent catalyst is derived from two sources. On the one hand, the spent catalyst contains true sulphurous deposits, which were deposited on the catalyst during its previous use. On the other hand, the catalyst also contains sulphur in the form of sulphides of the hydrogenation metals, resulting from the sulphidation step to which the catalyst is subjected to activate it. During the thermal treatment in the process according to the invention, the true sulphurous deposits are completely removed from the catalyst, while the metal sulphides are converted to metal oxides. In the context of the present specification the removal of sulphurous deposits by way of a thermal treatment is meant to encompass both these processes. It should be noted that if spent catalyst, or more in general, used catalyst, is used in the process according to the invention, it is essential that the spent catalyst is subjected to said thermal treatment to remove carbonaceous and sulphurous deposits before it is processed further. This is for the following reasons. The spent catalyst may contain up to 25 wt. % of carbonaceous deposits, calculated as carbon on the weight of the total spent catalyst, and will additionally contain a substantial amount of sulphur. If the removal of carbonaceous and sulphurous deposits were carried out after the spent catalyst had been ground and shaped, the presence of carbon and sulphur would detrimentally affect the binding properties of the binder, leading to a newly formulated catalyst of insufficient strength. Further, the carbon and sulphur content of the spent catalyst varies from source to source. If one were to start from material from which the carbonaceous and sulphurous deposits had not been removed, these inhomogeneities in the starting material would be reflected in an end product of inhomogeneous quality. Moreover, the grinding of catalyst containing carbonaceous and sulphurous deposits is a hazardous operation, because spent catalyst containing these materials is pyrophoric (self-heating). Obviously, thermal treatment (i) can be dispensed with if waste catalyst is used which does not contain any carbonaceous or sulphurous deposits.

In the following step, the catalyst, which may be either spent hydroprocessing catalyst which has been subjected to a thermal treatment as described above or fresh catalyst, is ground, and the fraction with a particle size below 200 microns, preferably below 50 microns, more preferably below 20 microns, is isolated, for example by appropriate sieving techniques. The grinding can take place, e.g., in a conventional hammer mill.

The ground catalyst is then composed with a binder and, if desired, an additive. The binder is present to glue the various catalyst components together. The additive, which is optionally present, may function as low-cost filler and as a diluent for the metals content of the waste catalyst particles, and may also be used to modify the properties of the catalyst to be produced, for example, its density and pore size distribution. The additive can also add specific catalytic properties to the catalyst, such as hydrocracking activity or metal trap activity. It is of course impossible to make a sharp distinction between binders and additives, given that the compound added as an additive may also have some binding properties, while the compound added as a binder will also function as diluent and may provide the catalyst with additional properties. Examples of suitable binders are alumina, silica, silica-alumina, and titania. In general alumina is the most preferred binder, because it has good binding properties and can be easily kneaded. Its use generally results in catalysts with satisfactory properties as to, e.g., strength. Examples of suitable additives are silica-alumina, diatomaceous earth, sepiolite, and natural or synthetic clays such as kaolin and acid-leached kaolin. If so desired, spent or fresh FCC catalyst, optionally after grinding, may be incorporated into the catalyst to be prepared by the process according to the invention. Amounts of up to 30 wt. %, calculated on the new catalyst, are envisaged. The addition of FCC catalyst can have a positive effect on the strength of the catalyst to be produced, as well as on the conversion of high boiling feedstocks with the resulting catalyst. The amount of waste catalyst, binder, and additive will vary with the intended use of the catalyst. This will be elucidated further below.

The mixture comprising the ground catalyst, the binder, and, optionally, additives is then shaped into particles. This is done by procedures known in the art, such as extrusion, granulation, beading, tablet pressing, pill making, bricketing, etc. The size of the particles will depend on the use envisaged for the newly formulated catalyst. The shape of the newly formulated catalyst particles is variable. Suitable shapes are cylinders, beads, rings, and symmetrical and asymmetrical polylobes, such as tri- or quadrulobes. Cylinders are sometimes preferred for reasons of strength.

After the shaping step, the resulting catalyst particles will generally be submitted to a drying step followed by a calcination step. The drying step may be carried out at a temperature of 40° to 150° C., preferably 100° to 130° C., for a period of 0.5 to 48 hours. The calcination step will generally be carried out at a temperature in the range of 350° to 600° C. for a period of 0.5 to 48 hours in an oxidising atmosphere.

As indicated before, the present invention is based on the fact that a treatment with a large amount of water or an acidic or basic aqueous solution is not only unnecessary when preparing a newly formulated hydroprocessing catalyst with good properties, but is in fact attended with undesirable results. In consequence, in the process according to the invention the amount of water is limited by limiting the LOI of the catalyst preparation mixture during the steps of grinding, reformulating, and shaping to a value not exceeding 70%. However, this does not mean that the process according to the invention is carried out in the complete absence of water or acidic or basic aqueous solutions. In the first place, the compounds to be added to the catalyst composition contain some internal water, which appears from their showing LOI. Further, a limited amount of water or acidic or basic aqueous solution will generally be added to the catalyst composition during the various process steps of grinding, mixing with other components, and shaping. For example, the addition of water during the grinding step may be desirable to facilitate the grinding. During the mixing step it may be desirable to add one of the components in the form of an aqueous solution or dispersion, or it may be desired to add some water for easier mixing. During the shaping step some water may be added to facilitate the shaping, or some acidic aqueous solution may be added to peptise an alumina binder, if present. However, in any case the LOI of the catalyst preparation mixture present in steps (ii), (iii), and (iv) of the process according to the invention should be less than 70%. As stated before, the presence of less water or aqueous solution leads to major advantages from the point of view of processing technology, and in the case of basic or acidic aqueous solutions being employed also to less risk of leaching of hydrogenation metals.

In general, all types of spent and waste hydroprocessing catalysts can be used as starting material in the process according to the invention. One type of catalyst which is suitable for use in the process according to the invention takes the form of catalysts which have been used in or, as the case may be, are suitable for use in, the hydroprocessing of light hydrocarbon feeds. These catalysts generally have a Group VI hydrogenation metals content in the range of 10–35 wt. %, preferably 17–35 wt. %, calculated as trioxide, and a Group VIII hydrogenation metals content of 1–10wt. %, preferably 2–6 wt. %, calculated as oxide. The Group VI hydrogenation metal component generally is Mo or W. The Group VIII hydrogenation metal component generally is Ni or Co. The catalyst may optionally comprise phosphorus, which generally is present in an amount of 0–10 wt. %, calculated as $P_2O_5$. The catalyst carrier generally is alumina comprising a minor amount of silica, i.e., up to 20 wt. %. These catalysts generally have a mean pore diameter (MPD) in the range of 4–15 nm, preferably 6–10 nm. In the context of the present specification the term MPD is defined as that diameter at which half of the pore volume is in pores with a diameter below said diameter and half of the pore volume is present in pores with a diameter above said diameter. The pore volume is defined as the pore volume determined by mercury intrusion present in pores with a diameter below 100 nm. The use of these types of catalysts in the process according to the invention is particularly attractive for two reasons. In the first place, as has been explained before, it is difficult to dispose of these types of catalysts by land-filling or metals reclaiming. In the second place, catalysts which have been used for the hydroprocessing of light hydrocarbon feeds are relatively clean in that they contain hardly any contaminant metals, for example, they contain less than 5 wt. % of contaminant metals, calculated as oxide on the catalyst from which sulphurous and carbonaceous deposits have been removed, more preferably less than 3 wt. %, most preferably less than 1 wt. %.

Another, though less preferred, source of waste catalyst for use in the process of the invention consists of catalysts which have been used in, or are suitable for use in, the hydroprocessing of resids. Resid catalysts have an MPD of the order of 6–25 nm and a relatively low hydrogenation metals content, with the Group VI hydrogenation metal generally being present in an amount below 17 wt. % for molybdenum, calculated as trioxide, and the Group VIII hydrogenation metal generally being present in an amount below 6 wt. %, calculated as oxide. Still another source of waste catalyst suitable for use in the process according to the invention is a catalyst which has been used for the pretreatment in the presence of hydrogen of feeds which are to be subjected to fluidised catalytic cracking processes. These catalysts generally have a Group VI hydrogenation metals content of 10–30 wt. %, calculated as trioxide, and a Group VIII hydrogenation metals content of 1–6 wt. %, and an MPD in the range of 7–13 nm. The outer surface of these spent FCC pretreat catalyst particles is highly contaminated with vanadium, but, as appears from analysis of the cross-section of the catalyst particles, the contamination is mainly present in the outer rim of the catalyst particles, with the inner part of the catalyst particle having little or no contamination. In consequence, when this type of spent catalyst is subjected to a temperature treatment to remove carbonaceous and sulphurous deposits and subsequently ground, a particulate material is obtained the larger part of which is hardly contaminated, while only a small part is heavily contaminated. By incorporating the above-mentioned particulate material into a newly formulated catalyst with the process according to the invention, it becomes possible to profit from the uncontaminated inside of the catalyst particles. As will be evident to the skilled person, one may of course also use mixtures of various types of spent and waste catalyst materials.

It is noted that the composition of the catalysts given above is based upon the catalyst as it was in its unused state. The term hydrogenation metals is used to indicate those metals which were incorporated into the catalyst composition on purpose during catalyst preparation. The metals which are deposited on the catalyst composition during use are referred to as contaminant metals. Because the amount of contaminant metals present on the catalyst composition depends on the specific process in which the catalyst has been used, it is difficult to give figures for the amount of contaminant metals present in the spent catalyst in general. As indicated earlier, spent catalyst containing up to a total of 15 wt. % of contaminant metals, calculated as oxide on the basis of the spent catalyst from which carbonaceous and sulphurous deposits have been removed, are suitable for use in the process according to the invention. However, in the process according to the invention it is preferred to use waste catalyst which contains few contaminant metals, either because it has not been used, or because it has been used for the hydroprocessing of feeds containing little or no contaminant metals. Preferably, the waste catalyst contains not more than 5 wt. %, more preferably not more than 3 wt. %, still more preferably not more than 1 wt. % of contaminant metals, calculated on the catalyst from which carbonaceous and sulphurous deposits have been removed ("clean" catalyst).

If so desired, additional hydrogenation metals may be added to the catalyst composition, e.g., by impregnating the newly formulated catalyst with an impregnation solution comprising water soluble salts of the hydrogenation metals to be incorporated into the catalyst composition. Other compounds of which the incorporation into the newly formulated catalyst composition may be desired, such as phosphorus, may also be incorporated into the catalyst composition by impregnation, either in combination with additional metals or separately. When the newly formulated catalyst is impregnated as such, a fair amount of hydrogenation metals will be adsorbed by the ground waste catalyst particles. If this should be objectionable, it is possible to contact the additive with hydrogenation metals or phosphorus before it is mixed with the ground waste catalyst particles. Alternatively, extra metals can be incorporated into the catalyst composition by mixing metals components in the solid state with the mixture of ground calcined waste catalyst, binder, and, optionally, additive. This method is particularly attractive for molybdenum oxide. Of course, a combination of the two procedures is also possible.

For good order's sake it is noted that if additional metals are added to the catalyst composition, care should be taken again to ensure that the LOI of the catalyst preparation mixture does not exceed 70% during the optional addition of additional metals or other components.

The term catalyst suitable for the hydroprocessing of heavy feedstock refers to a catalyst which can effect one or more of the following processes on a heavy hydrocarbon feedstock for a reasonable period of time: hydrodesulphurisation, hydrodenitrogenation, hydrodemetalisation, and hydrocracking. By the wording reasonable period of time we mean a period of time which a skilled person will consider acceptable on a commercial time scale.

The catalyst prepared by the process according to the invention is suitable for the hydroprocessing of heavy feedstocks. Examples of heavy feedstocks which can be subjected to hydroprocessing with the catalyst prepared by said process are feeds comprising atmospheric residues, vacuum residues, residues blended with gas oils, particularly vacuum gas oils, crudes, shale oils, and tar sand oils. Generally, the boiling range of such heavy feedstocks is such that at least 70% by volume will boil above 450° C. The initial boiling point will generally be 300° C., frequently 350° C. The sulphur content of the feed is generally above 1 wt. % and will frequently be more than 3 wt. %. The nitrogen content is generally above 500 ppm and will frequently be in the range of 500 to 4000 ppm. The feedstock contains contaminant metals such as vanadium, nickel, and iron, generally in amounts above 3 ppm, frequently in the range of 30 to 1000 ppm, and more frequently in the range of 50–300 ppm, calculated as metal.

Two types of processes for the hydroprocessing of heavy feedstocks can be recognised in the art, namely fixed bed processes and moving bed processes. In a fixed bed process, the feed is led through a fixed catalyst bed under conditions of increased temperature and pressure. Typical fixed bed hydroprocessing conditions include temperatures between 300 and 450° C., hydrogen pressures between 25 and 200 bar, $H_2$:oil ratios between 300 and 2000 Nl/l, and space velocities ($hr^{-1}$) between 0.1 and 3. In the hydroprocessing of heavy feeds a graded catalyst system is commonly used. This means that the feed is first contacted with a catalyst suitable for removing the metal components from the feedstock. The effluent from the first catalyst bed is, after optional fractionating and phase separation, fed to a second catalyst bed, optionally followed by further beds. The second and further catalyst beds are to effect hydrodesulphurisation, hydrodenitrogenation, and/or removal of Conradson Carbon. A graded catalyst system generally comprises two to five catalyst beds. Fixed bed processes for the hydroprocessing of heavy hydrocarbon feedstocks are know in the art and need no further elucidation here. As the name says, the crux of a moving bed process is that the catalyst particles move with respect to the reactor in which they are contained, with the result that the catalyst particles and the feed are fully backmixed. An example of a moving bed process is an expanded moving bed process, also indicated as an ebullated bed process. In a typical ebullated bed process, HRI's H-oil process, the feed and the hydrogen-containing gas with which the feed is to be treated are introduced into the bottom of a reactor containing an ebullated bed catalyst. Spent catalyst is withdrawn from the bottom of the reactor at regular intervals, while fresh catalyst is added to the top. This eliminates the need to shut down the plant for catalyst replacement. In the expanded moving bed, an intimate contact between the catalyst particles, the feed, and the hydrogen is effected by means of internal circulation. The moving bed technology has the advantage of being very flexible with regard to the nature of the feedstocks offered. Suitable feedstocks are, e.g., vacuum residua, atmospheric residua, and heavy crudes. The product will be, e.g., gasoline, light gas oil, vacuum gas oil, and atmospheric gas oil. One advantage of a moving bed process over a fixed bed process is the constant quality of the product obtained, because, unlike in a fixed bed process, there is no deactivation of the catalyst as a function of time. Several types of moving bed processes, among them ebullated bed processes, are known in the art. Mention may be made of the above-mentioned H-oil process and Lummus's LC-fining process.

Moving bed processes are generally carried out at a temperature between 400° and 500° C., a pressure between 100 and 200 bar, and an $H_2$/oil ratio of between 700 and 1400 Nl/l. The catalyst addition rate is generally in the range of 0.3–3 kilograms of catalyst per cubic meter of feed. It should be noted that the specific values for all these parameters, and in particular for catalyst consumption, depend heavily on the nature of the feed, the nature of the catalyst, and the other process conditions.

The nature of the process by which the heavy feed will be hydroprocessed influences the properties of the catalyst or catalysts to be used therein. For example, the properties of a fixed bed catalyst suitable for the hydroprocessing of heavy feedstocks will depend upon whether it is to be used in a graded bed catalyst system, and if so, whether it is to be used in the earlier or in the later stages of such a system. In a graded bed system, the feedstock is first contacted with a catalyst having a high MPD and a low metals content, which catalyst is particularly suitable for effecting hydrodemetalisation. The further catalyst or catalysts have consecutively lower MPDs and consecutively higher metals contents, to make them consecutively more suitable for hydrodesulphurisation and hydrodenitrogenation.

Due to the nature of the process, grading is impossible in moving bed reactors. Therefore, the properties of a moving bed catalyst must be selected so that each catalyst particle can perform all reactions which need to be carried out. The properties of moving bed catalysts and fixed bed catalysts suitable for the hydroprocessing of heavy feedstocks will be discussed in more detail below.

In order to be suitable for use in the hydroprocessing of heavy feedstocks, the catalyst prepared by the process according to the invention should have a particle diameter over its smallest cross-section of 4 mm or lower, preferably 2 mm or lower, more preferably between 0.5 and 1.5 mm. For fixed bed catalysts the particle diameter over its smallest cross-section is preferably 1.0–1.5 mm, for moving bed catalysts the particle diameter over its smallest cross-section is preferably 0.8–1.3 mm.

The catalyst suitable for the hydroprocessing of heavy feedstocks prepared by the process according to the invention generally comprises a Group VI metal in an amount of 0.01–0.12 mole per 100 grams of catalyst, and/or a Group VIII metal in an amount of 0.004–0.08 mole per 100 grams of catalyst. Preferably, the catalyst comprises molybdenum and/or tungsten as Group VI metal component in combination with nickel and/or cobalt as Group VIII metal component. An amount of 0.01–0.12 mole molybdenum per 100 grams of catalyst can be recalculated to 1.5–17 wt. % of molybdenum, calculated as trioxide on the weight of the catalyst. For tungsten an amount of 0.01–0.12 mole per 100 grams of catalyst can be calculated to correspond to 2.3–27 wt. % of tungsten, calculated as trioxide, on the weight of the catalyst. For the Group VIII metals nickel and cobalt an amount of 0.004–0.08 mole per 100 grams of catalyst can be calculated to correspond to an amount of 0.3–6 wt. %, calculated as oxide on the catalyst. A fixed bed catalyst which is to be used in the earlier stages of a heavy feed hydroprocessing operation, which is to effect mainly hydrodemetalisation, preferably has a Group VI metal content of 0.01–0.09 mole per 100 grams of catalyst and a Group VIII metal content of 0.004–0.05 mole per 100 grams of catalyst. For a catalyst comprising molybdenum and nickel this would yield a catalyst comprising 1.5–13 wt. % of molybdenum, calculated as trioxide on catalyst, and 0.3–4 wt. % of nickel, calculated as oxide on the catalyst. A fixed bed catalyst which is to be used in the later stages of a heavy feed hydroprocessing operation, which is to effect mainly hydrodesulphurisation and/or hydrodenitrogenation, preferably has a Group VI metal content of 0.06–0.12 mole per 100 grams of catalyst and a Group VIII metal content of 0.02–0.08 mole per 100 grams of catalyst. For a catalyst comprising molybdenum and nickel this would yield a catalyst comprising 8–17 wt. % of molybdenum, calculated as trioxide on catalyst, and 1.5–6 wt. % of nickel, calculated as oxide on the catalyst.

A moving bed catalyst which is to be used in a heavy feed hydroprocessing operation, which is to effect hydrodemetalisation as well as hydrodesulphurisation and/or hydrodenitrogenation, preferably has a Group VI metal content of 0.035–0.12 mole per 100 grams of catalyst and a Group VIII metal content of 0.013–0.08 mole per 100 grams of catalyst. For a catalyst comprising molybdenum and nickel this would yield a catalyst comprising 5–17 wt. % of molybdenum, calculated as trioxide on catalyst, and 1–6 wt. % of nickel, calculated as oxide on the catalyst. It may be attractive to incorporate a phosphorus component into the catalyst composition, especially if the catalyst is to effect hydrodenitrogenation of heavy hydrocarbon feedstocks. If phosphorus is incorporated into the catalyst composition, it is preferably present in an amount of 0–0.14 mole per 100 grams of catalyst, which is equivalent to 0–10 wt. % of phosphorus, calculated as $P_2O_5$, on the catalyst.

The fixed bed catalysts suitable for the hydroprocessing of heavy feedstocks prepared by the process according to the invention generally have a pore volume of 0.4–1.5 ml/g, and an MPD of 6–25 nm as determined by mercury porosimetry.

The fixed bed catalysts to be used in the earlier stages of the hydroprocessing operation preferably have a pore volume of 0.5–1.5 ml/g and an MPD of 12–25 nm. The fixed bed catalysts to be used in the later stages of the hydroprocessing operation preferably have a pore volume of 0.4–0.8 ml/g and an MPD of 6–15 nm. Moving bed catalysts, and particularly ebullated bed catalysts, can be divided into two groups, namely monomodal catalysts, which have an MPD in the range of 10–15 nm, and bimodal catalysts, which have an MPD of 4–12 nm, preferably 6–9 nm, and which additionally have a substantial amount of pore volume present in the macropore range, that is in pores with a diameter above 100 nm. Preferably, a bimodal moving bed catalyst prepared by the process according to the invention has a total pore volume of 0.5 to 1.0 ml/g, preferably 0.6–1.0 ml/g, with the macropore volume being 0.05–0.3 ml/g, preferably 0.1–0.25 ml/g. Generally speaking, it is envisaged to prepare catalysts suitable for use in fixed bed or moving bed processes with the process according to the invention which comprise 5–95 wt. % of waste catalyst and 95–5 wt. % of other components.

The process according to the invention is particularly suitable for the preparation of moving bed catalysts from spent or waste hydroprocessing catalysts. A fixed bed catalyst is intended to stay in a unit for a long period of time, for example 4 months to 2 years. If the catalyst has to be replaced ahead of scedule, this is expensive for the refinery because of the extra down-time of the reactor. On the other hand, in a moving bed process the catalyst is continuously replaced. Therefore, the quality of the product is more important for fixed bed catalysts than for moving bed catalysts. This means that the sales price of a moving bed catalyst suitable for the hydroprocessing of heavy feedstocks is even more critical than the sales price of a fixed bed catalyst suitable for the hydroprocessing of heavy feedstocks. Therefore, it is especially attractive to prepare moving bed catalysts from the inexpensive starting material consituted by spent or waste hydroprocessing catalyst. An interesting embodiment of the present invention is the preparation of a bimodal ebullated bed catalyst using 20–80 wt. % of waste hydroprocessing catalyst, 5–30 wt. % of binder, and 5–50 wt. % of a macroporous additive. As has been explained above, various hydroprocessing catalysts have an MPD in the same range as the MPD of the mesopores of a bimodal ebullated bed catalyst. However, they generally do not possess the macropore volume required for an ebullated bed catalyst. This deficiency is remedied by the addition of a macroporous additive, such as diatomaceous earth, sepiolite, and natural or synthetic clays such as kaolin and acid leached kaolin. Apart from adding macropore volume, the macroporous additive may also function as diluent for the metals present in the hydroprocessing catalyst starting material, the metals content of which is generally higher than the metals content desired for the ebullated bed catalyst to be prepared. Further, the additive can be used to ensure that the new catalyst has a bulk density suitable for use in ebullated bed processes. The bulk density of the starting catalyst will generally be too high for an ebullated bed catalyst. The addition of a macroporous additive to the newly formulated catalyst composition will lead to a decreased bulk density, rendering the catalyst suitable for use in ebullated bed processes. Waste hydroprocessing catalyst which has been used for, or, as the case may be, was suitable for use in, the hydrodesulphurisation or hydrodenitrogenation of light hydrocarbon feeds is a particularly suitable starting material for this embodiment. As explained above, these catalysts have a Group VI metal component of 10–35 wt. %, particularly 17–35 wt. %, and a Group VIII metal content of 1–10 wt. %, particularly 2–6 wt. %, with an MPD of 4–15 nm, more particularly 6–10.

Depending on the intended use of the newly formulated catalyst it may be desirable to sulphide the catalyst prior to it being used it, that is, to render the metal components present therein sulphidic. This can be done in a conventional manner, say, by contacting the catalyst in the reactor at increasing temperature with hydrogen and a sulphur-containing feed, which is optionally spiked with a sulphur compound such as DMDS, or with a mixture of hydrogen and hydrogen sulphide, or by ex situ presulphiding followed by activation. Generally, presulphidation is desirable when the catalyst is to be used in a fixed bed process, while as a rule no presulphidation will be carried out when the catalyst is to be used in a moving bed process, more particularly, an ebullated bed process.

EXAMPLE 1

This example illustrates the limited effectiveness of the water treatment described in Japanese laid-open No. 68890/1977. A spent hydrotreating catalyst comprising molybdenum and cobalt as hydrogenation metals and vanadium and nickel as contaminant metals was subjected to a thermal treatment for 10 hours at a temperature of 525° C. in air to remove carbonaceous and sulphurous deposits. The thermally treated catalyst was ground to a particle size below 200 microns. The ground catalyst was mixed with 50 grams of alumina binder per 100 grams of spent catalyst. Then, the mixture was shaped by extrusion to form cylindrical extrudates with a diameter of 1.0 mm. The extrudates were calcined for 2 hours at a temperature of 450° C. in air. 20 grams of each type of calcined extrudate were subjected to the solution treatment described in Examples 1 to 5 of the Japanese laid-open publication, followed by the calcination step described in that publication. The metals content of each newly formed catalyst was determined after the final calcination step. The treatment conditions, the final calcination temperature, and the metals content of each sample are given in Table 1.

publication does result in the removal of the contaminant nickel, but only at the cost of the concomitant removal of desirable hydrogenation metals. Vanadium removal does not take place at all.

EXAMPLE 2

This example describes the production of an ebullated bed catalyst with the process according to the invention. The starting material was a spent hydrodesulphurisation catalyst comprising 10 wt. % of carbonaceous deposits, calculated as C, and 10.3 wt. % of sulphur, calculated as S. These were removed from the catalyst by subjecting it to a heat treatment at a temperature of 525° C. for a period of 10 hours in an oxygen-containing atmosphere. The thus obtained clean spent catalyst comprised 20 wt. % of Mo, calculated as trioxide, 5 wt. % of Co, calculated as oxide, 0.2 wt. % of V, calculated as oxide, and 0.1 wt. % of Ni, calculated as oxide, all based on the weight of the clean spent catalyst. 2970 grams of clean spent catalyst (LOI 12.4%) were mixed with 1410 grams of alumina (LOI 25.7%) and 393 grams of diatomaceous earth (LOI 8.4%). To the thus obtained mixture were added 24 grams of 54 wt. % nitric acid dissolved in 1500 grams of water, after which the resulting mixture was kneaded. After 12 minutes 250 grams of water were added, and the mixture was kneaded again. This action was repeated a few times until the mixture was extrudable. At that point the LOI of the mixture was about 45%. The thus obtained mixture was extruded using a Welding extruder at a pressure of 40 bar to form extrudates with a diameter of 1 mm. The extrudates were dried overnight at a temperature of 120° C. and subsequently calcined for 1 hour at a temperature of 600° C. in air. The final catalyst comprised 13 wt. % of molybdenum, calculated as trioxide, 3.0 wt. % of cobalt, calculated as oxide, 10 wt. % of diatomaceous earth, and the balance alumina. It had a compact bulk density of 0.58 gram/ml, and a $PV(H_2O)$ of 0.71 ml/g.

EXAMPLE 3

To further illustrate the present invention various other ebullated bed catalysts were prepared in the same manner as

TABLE 1

| | | Treatment | | | | | | |
|---|---|---|---|---|---|---|---|---|
| | | Amount | T | Time | Calc. T | Metals content (wt. %) | | | |
| No | Solution | (ml) | (°C.) | (h) | (°C.) | $MoO_3$ | CoO | NiO | V |
| 1 | no | — | — | — | — | 14.3 | 4.0 | 0.90 | 3.7 |
| 2 | water | 50 | 80 | 2 | 500 | 11.9 | 2.1 | 0.66 | 3.5 |
| 3 | 1% HCOOH | 100 | 20 | 10 | 500 | 9.8 | 1.8 | 0.55 | 2.9 |
| 4 | 2N $NH_3$ | 100 | 20 | 10 | 300 | 6.9 | 3.8 | 0.62 | 3.7 |
| 5 | 2.5N HCl | 50 | 50 | 2 | 600 | 11.1 | 1.2 | 0.37 | 3.3 |

From Table 1 it appears that compared with the untreated sample 1 all treatments, whether with water or with an acidic or basic solution, lead to a decrease of the content of the hydrogenation metals Mo and Co and the contaminant metal Ni. The decreased Mo content is most pronounced when formic acid or ammonia is used. The decreased Co content is most pronounced when formic acid or hydrochloric acid is used, while the use of water will also lead to a decrease of the Co content of almost 50%. Only the use of formic acid has a significant influence on the vanadium content of the catalyst. From these results the following conclusions can be drawn. The treatment with water or an acidic or basic solution which is considered essential by the Japanese patent described in Example 2, except that the diatomaceous earth was replaced by equivalent amounts of sepiolite, FCC catalyst, kaolin, and bauxite, to obtain catalysts containing 13 wt. % of molybdenum, calculated as trioxide, and 3.0 wt. % of cobalt, calculated as oxide, 10 wt. % the specified additive, and the balance alumina.

The $PV(H_2O)$ of the various catalysts is given in the following Table.

| Catalyst | Additive | PV(H$_2$O) (ml/g) |
|---|---|---|
| 2 | sepiolite | 0.60 |
| 3 | FCC catalyst | 0.61 |
| 4 | kaolin | 0.65 |
| 5 | bauxite | 0.67 |

EXAMPLE 4

The activity of the catalyst according to the invention prepared in Example 2, henceforth indicated as Catalyst A, was determined in comparison with a commercially available ebullated bed catalyst comprising 13 wt. % of molybdenum, calculated as trioxide, and 3.2 wt. % of cobalt, calculated as oxide. The catalyst had a CBD of 0.58 g/ml and a PV(H$_2$O) of 0.73 ml/g. This commercial catalyst is henceforth indicated as Comparative Catalyst B. The test was executed in an upflow tubular reactor, with the two catalysts being tested side by side. Two reaction tubes were filled with 75 ml of catalyst homogeneously intermixed with 80 ml of carborundum particles. After the catalysts had been pre-sulphided using an SRGO in which dimethyl sulphide had been dissolved to an S content of 2.5 wt. %, a preheated Kuwait vacuum gas oil was passed over the catalyst for a period of one day. Then, a Kuwait atmospheric residue with the properties given in Table 2 was passed over the catalyst for a period of 8 days, under the test conditions given in Table 3. In Table 2, the amount of asphaltenes (IP-143) stands for the weight fraction of the feed which is insoluble in n-heptane. The other parameters are known to the person skilled in the art.

TABLE 2

Properties of Kuwait atmospheric residue

| | |
|---|---|
| Density (ASTM D-4052) (50°) | 0.9524 |
| Sulphur content (S) | 4.167 wt. % |
| Nitrogen content (N) | 2581 ppm |
| Asphaltenes (IP-143) | 3.7 wt. % |
| Conradson Carbon (CCR) | 11.95 wt. % |
| Nickel content | 20 ppm |
| Vanadium content | 66 ppm |

Boiling point data:

| | |
|---|---|
| IBP | 279° C. |
| 5 vol. % | 346° C. |
| 10 vol. % | 378° C. |
| 20 vol. % | 416° C. |
| 30 vol. % | 447° C. |
| 40 vol. % | 493° C. |
| 50 vol. % | 527° C. |

TABLE 3

Test conditions

| | |
|---|---|
| Pressure | 155 bar gauge |
| H2/oil | 800 Nl/l |
| Temperature | 425° C. |
| LHSV | 1.0 h$^{-1}$ |
| Days | 8 |

When the system had reached an equilibrium state, the activities of the two catalysts were compared. The test results are given in Table 4, expressed as relative weight activity of Catalyst A for the different components in the feed as compared with Comparative Catalyst B. The determination of the relative weight activities (RWA) was carried out as follows.

RWA HDN: For each catalyst the reaction rate constant (kHDN) was calculated on the basis of the obtained nitrogen content of the product vis-a-vis the nitrogen content of the feedstock. The reaction rate constant for Comparative Catalyst B was valued at 100, and the reaction rate constant of Catalyst A according to the invention was recalculated to give the desired RWA HDN value. The RWAs for sulphur, metals, and Conradson Carbon were calculated in an analogous manner from, respectively, the amounts of sulphur, metals, and Conradson Carbon present in feed and product.

RWA Conversion: For both catalysts the conversion to products having a boiling point below 537° C. was determined, taking into account the portion of the feedstock already boiling in this range. From these conversions two rate constants were calculated, one for Catalyst A, the other for Comparative Catalyst B. The latter was valued at 100, after which a recalculation of the former gave the RWA value.

TABLE 4

Test results

| | |
|---|---|
| RWA HDN | 103 |
| RWA HDS | 100 |
| RWA HDM | 110 |
| RWA HDCCR | 97 |
| RWA Conversion | 100 |

From these test results it appears that Catalyst A according to the invention is substantially as good as the commercially available Comparative Catalyst B and even shows a better HDM. This shows that it is possible to prepare an ebullated bed catalyst with good properties from a waste material with the process according to the invention.

What is claimed is:

1. A process for preparing a catalyst which is suitable for the hydroprocessing of heavy hydrocarbon feeds and comprises 0.01–0.12 mole of Group VI hydrogenation metal comprising one or both of molybdenum and tungsten per 100 grams catalyst and 0.004–0.08 mole of Group VIII hydrogenation metal comprising one or both of nickel and cobalt per 100 grams catalyst on a refractory oxide carrier, which process comprises the steps of (i) subjecting a used hydroprocessing catalyst containing carbonaceous and sulfurous deposits to a thermal treatment in an oxygen-containing atmosphere at a temperature of 300–600° C. for a period of 0.1–48 hours to remove carbonaceous and sulfurous deposits, with the used hydroprocessing catalyst comprising a Group VI hydrogenation metal component comprising one or both of molybdenum and tungsten and a Group VIII hydrogenation metal component comprising one or both of nickel and cobalt on a refractory oxide carrier, (ii) grinding the material obtained in step (i), (iii) mixing the ground material obtained in step (ii) with a binder and, optionally, one or more additives, and (iv) shaping the mixture to form a new catalyst, followed by drying and calcination, wherein the thermal treatment of step (i) is conducted prior to grinding of the used hydro processing catalyst, and wherein the loss on ignition of the catalyst composition mixture at any point in the steps (ii), (iii), and (iv) is not higher than 70%.

2. A process according to claim 1, wherein the used hydroprocessing catalyst is spent hydroprocessing catalyst which has been used for hydroprocessing substantially metal-free hydroprocessing feedstocks.

3. A process according to claim 1, wherein the used catalyst is spent hydroprocessing catalyst which has been used for hydroprocessing metals-containing hydroprocessing feedstocks, which catalyst has a total contaminant metals content of up to 15 wt. %, calculated as oxide, based on the weight of the catalyst from which carbonaceous and sulfurous deposits have been removed by thermal treatment.

4. A process according to claim 1, wherein the binder comprises alumina.

5. A process according to claim 1, wherein the one or more additives are present and comprise diatomaceous earth, kaoline, or sepiolite.

6. A process according to claim 1, wherein additional hydrogenation metals, phosphorus or both are added to the new catalyst.

\* \* \* \* \*